Figure 1:
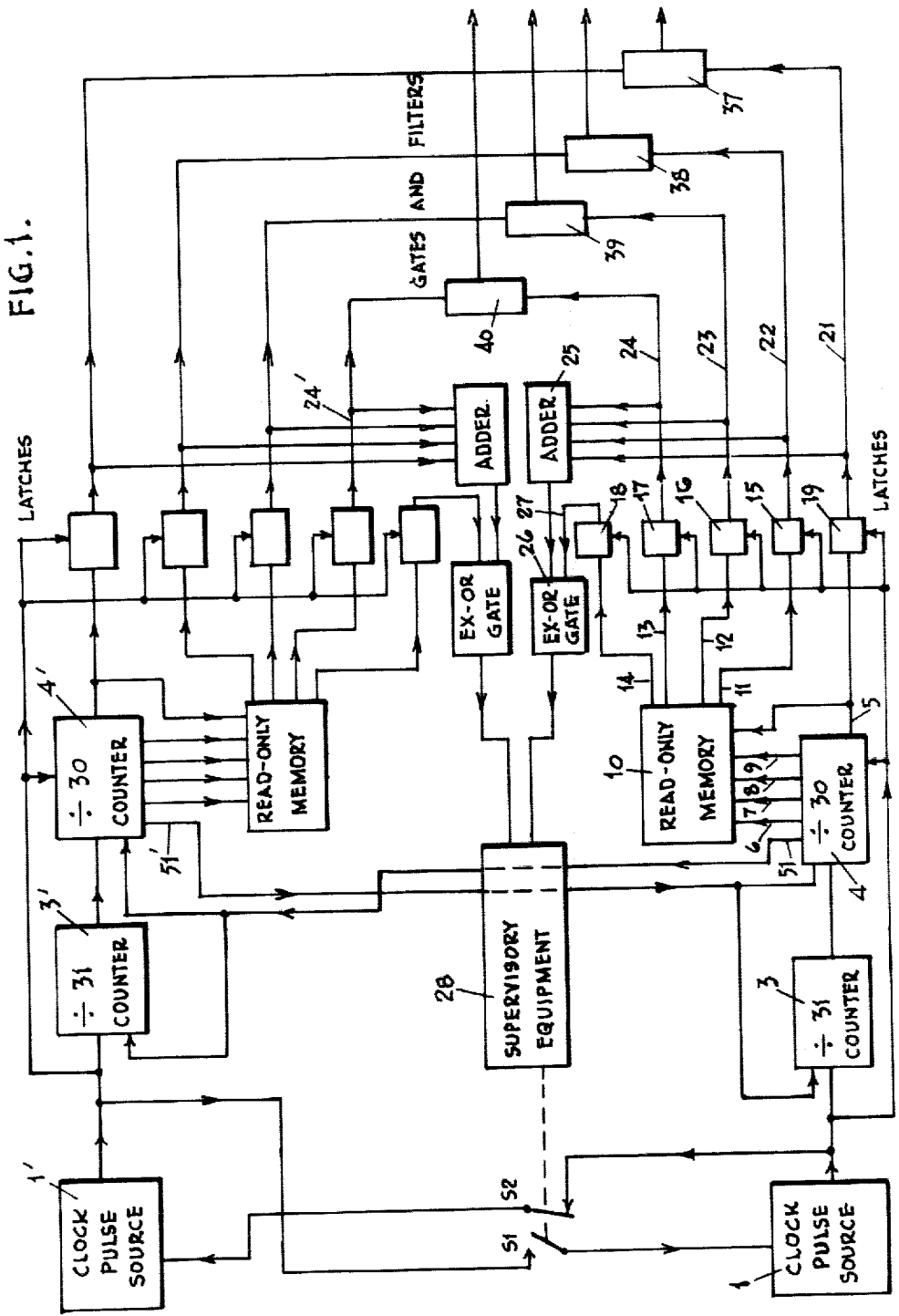

United States Patent [19]

Beckwith et al.

[11] 4,306,190

[45] Dec. 15, 1981

[54] PLURAL FREQUENCY SIGNAL GENERATOR

[75] Inventors: Clive J. Beckwith, Nuneaton; Philip Wright, Coventry; Charles E. Dingle, Rugby, all of England

[73] Assignee: The General Electric Company Limited, London, England

[21] Appl. No.: 30,725

[22] Filed: Apr. 17, 1979

[30] Foreign Application Priority Data

Apr. 21, 1978 [GB] United Kingdom ............... 15848/78

[51] Int. Cl.³ .................. H03K 3/80; H03K 3/027; H03L 7/16
[52] U.S. Cl. ............................ 328/62; 328/14; 328/15; 307/271
[58] Field of Search .................. 328/14, 62, 15; 307/271

[56] References Cited

U.S. PATENT DOCUMENTS

| | | | |
|---|---|---|---|
| 3,691,471 | 9/1972 | Cicognani et al. | 328/62 |
| 3,701,027 | 10/1972 | Belton | 328/62 X |
| 3,913,021 | 10/1975 | McCarthy et al. | 328/62 |

Primary Examiner—John S. Heyman
Attorney, Agent, or Firm—Kirschstein, Kirschstein, Ottinger & Cobrin

[57] ABSTRACT

For the purpose of generating oscillations having a plurality of different frequencies, a read-only memory stores a plurality of binary words which are read cyclically. The individual pulse signals supplied by the read-only memory, each such signal representing a succession of corresponding bits read from the read-only memory, are used to control latches and the required oscillations are obtained by filtering pulse signals supplied by the latches. To guard against equipment failure, the read-only memory and latches are duplicated, the pulse signals supplied by the two sets of latches being combined by means of gates before filtering.

11 Claims, 3 Drawing Figures

PLURAL FREQUENCY SIGNAL GENERATOR

This invention relates to methods of generating a plurality of electric signals of the kind in which the signals have different periodically recurring waveforms and is also concerned with apparatus for generating such signals. More particularly, but not exclusively, the signals have different fundamental frequencies.

One object of this invention is to provide a method of and apparatus for generating a plurality of electric signals of the kind specified utilising digital techniques.

According to one aspect of the present invention, in a method of generating a plurality of electric signals of the kind specified, a plurality of storage locations of a read-only memory are cyclically addressed, each such location storing a plurality of digit values so that the read-only memory supplies a plurality of digital signals as a result of being addressed as aforesaid, and the required output signals are supplied by individual means which are controlled by said digital signals.

Each of the individual means may comprise a latch which is arranged periodically to take up a state depending upon the controlling digit value at the time. If the digital signals supplied by the latches have different fundamental frequencies, those signals may be filtered to derive a plurality of oscillations having different frequencies.

According to another aspect of the present invention, apparatus for generating a plurality of electric signals comprises a read-only memory having storage locations for a plurality of digital words, means cyclically to address said storage locations, and a plurality of means arranged each to derive an electric pulse signal from corresponding digits of words read from the read-only memory as a result of being addressed as aforesaid, said plurality of means being arranged to respond to different digits of the words read from the read-only memory and the words being such that the plurality of pulse signals derived by the means have different fundamental frequencies.

Each of said plurality of means may comprise a latch which is arranged periodically to take up a state depending upon the controlling digit value at that time. The apparatus may also include a plurality of filters arranged respectively to select oscillations having different frequencies from the pulse signals supplied by said plurality of means.

In a signal generating system having some redundancy to guard against equipment failure, two like sets of apparatus as specified in the last but one paragraph above may be provided together with means to ensure that the two sets run in synchronism (i.e. both supply corresponding signals having the same frequency and phase relationship) and gating means to combine the corresponding signals supplied by the two sets.

The gating means may comprise a plurality of 'OR' gates, each of these 'OR' gates being arranged in the absence of equipment failure, to combine two corresponding signals supplied respectively by the two sets of apparatus. The system may also include a plurality of filters arranged respectively to select oscillations having different frequencies from the pulse signals supplied by the gating means.

Figure 3:
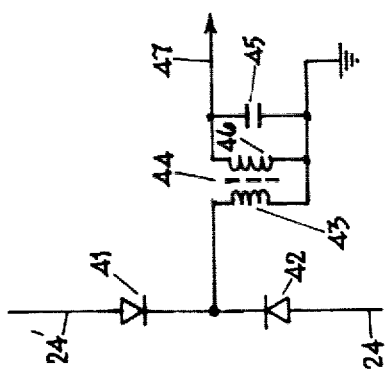
Figure 2:
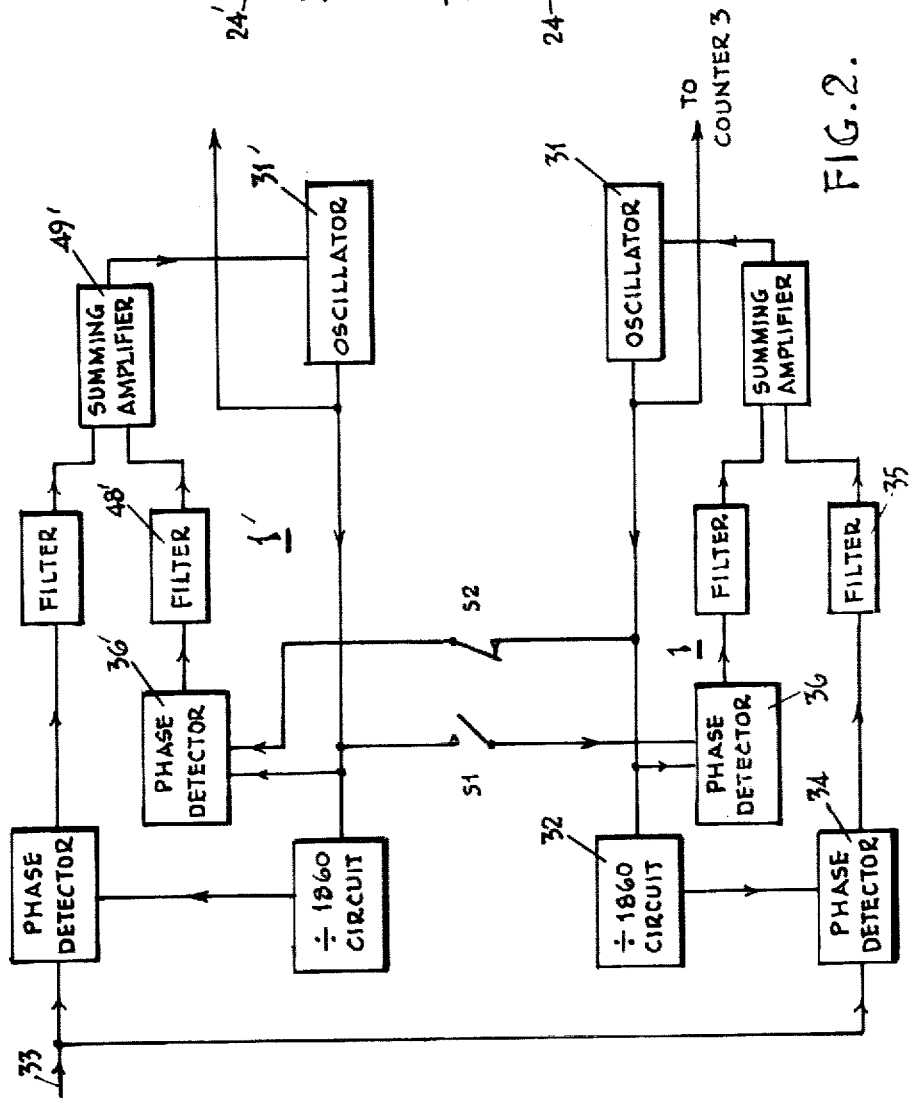

A system in accordance with the present invention for generating a plurality of oscillations which have different frequencies and which are suitable for use as carriers and other signals in a carrier telephony system will now be described by way of example with reference to the three figures of the accompanying drawings in which FIG. 1 shows the circuit of the system in diagrammatic form, FIG. 2 shows in more detail part of the circuit of FIG. 1, and FIG. 3 shows in more detail another part of the circuit of FIG. 1.

In FIG. 1 of the accompanying drawings, there are shown two identical generators in the upper and lower halves respectively, each of these generators being in accordance with the invention and serving to supply identical output signals. Initially only the generator shown in the lower half of the drawing will be considered.

Referring to FIG. 1, operation of the generator now to be described is controlled by a clock pulse source 1 which operates at a nominal frequency of 3.72 megahertz. The signal supplied by the source 1 over a lead 2 has a pulse waveform of approximately 1:1 mark/space ratio and is passed to a divide-by-31 counter 3 which responds to positive-going transitions of the clock pulse signal.

The binary signal supplied by the counter 3 is fed to a divide-by-30 counter 4 which responds to positive-going transitions of that signal. The counter 4 is in the form of a five-stage binary counter of which the first four stages are arranged in known manner to effect a count of fifteen before resetting to its initial state. The output signal supplied by the counter 4 over a lead 5 is thus a pulse signal having a 1:1 mark space ratio and a frequency of 4 kilohertz.

The output signals supplied by the first four stages of the counter 4 over leads 6, 7, 8 and 9 together with the output signal on the lead 5 are utilised cyclically to address thirty storage locations of a read-only memory 10, it being remembered that thirty two (i.e. $2^5$) different combinations of five binary signals are possible, although two of these combinations are not used in the present arrangement. Each individual storage location of the memory 10 is thus addressed at a frequency of 4 kilohertz.

Each storage location of the memory 10, which is of known form, is arranged to store a four-digit binary word. These words, arranged in columns in the order which they are addressed, are shown in the following table together with the digital value (shown in brackets) of the signal supplied over the lead 5 as each word location is addressed:

| | | |
|---|---|---|
| (0) 1010 | (0) 1111 | (1) 1011 |
| (0) 1100 | (0) 1001 | (1) 1000 |
| (0) 1010 | (0) 1010 | (1) 1110 |
| (0) 1001 | (0) 1100 | (1) 1000 |
| (0) 1111 | (0) 1010 | (1) 1011 |
| (0) 0000 | (1) 0001 | (1) 0100 |
| (0) 0011 | (1) 0111 | (1) 0010 |
| (0) 0101 | (1) 0001 | (1) 0001 |
| (0) 0011 | (1) 0010 | (1) 0111 |
| (0) 0000 | (1) 1100 | (1) 0001 |

Upon a storage location of the memory 10 being addressed as aforesaid, four binary signals representing respectively the four digits of the stored word are supplied over leads 11 to 14. Four bistable D-type latches 15 to 18 respond to the signals on the leads 11 to 14. Each of these latches remains in the state to which it had previously been set and can only change state as determined by the controlling digit value read from the memory 10 (i.e. in response to a signal on the appropriate lead 11, 12, 13 or 14) upon the occurrence of a negative-going transition of the signal on the lead 2. A similar latch 19 responds to the signal on the lead 5.

The signals on the output leads 21 to 24 of the latches 19 and 15 to 17 are thus pulse signals having rerecurrence frequencies of 4, 12, 40 and 60 kilohertz respectively, the 12 kilohertz signal being derived from the first digit (in the above table) of each stored word, the 40 kilohertz signal from the second digit and the 60 kilohertz signal from the third digit.

The fourth digit of each stored word read from the memory 10 is a parity-digit and, provided the generator is operating correctly, should be equal in digital value to the modulo-2 addition of the digital values of the signals on the leads 21 to 24. To effect a parity check, the signals on the leads 21 to 24 are passed to a modulo-2 adder 25 and the signal supplied by the adder 25 is passed to an exclusive OR gate 26 together with the signal supplied by the latch 18 over a lead 27. The two signals supplied to the gate 26 have the same digit value when the generator is operating currently and accordingly a signal is supplied by that gate to operate an alarm device (not shown) and/or to operate supervisory equipment 28 (the function of which will subsequently be explained) only when the generator malfunctions.

It is convenient at this point to consider the construction of the clock pulse source 1 in further detail. Referring now to FIG. 2 of the accompanying drawings, the source 1 comprises an oscillator 31 which supplies the required clock pulse signal to the lead 2. That signal is also passed to a divide-by-1860 circuit 32 to derive a signal having a frequency of 2 kilohertz. The latter signal which also has a pulse waveform of 1:1 mark/space ratio, and a pilot signal on lead 33 having a frequency which is an intergral multiple of 4 kilohertz (typically 60 or 64 kilohertz) are supplied to a phase detector 34. The output signal of the detector 34 after passing through a filter 35 is utilised to control the frequency of the oscillator 31, which may be of the varactor-controlled type. In this way the oscillator 31 is locked by means of a phase-locked loop to the pilot signal on the lead 33. (The auxiliary detector 36 is inoperative due to the switch S1 being open (as shown) and need not be further considered at this stage.)

As previously mentioned, the generator which has so far been described is duplicated in the complete system and, for ease of reference, items in the second generator (shown in the upper part of FIG. 1 and in part in FIG. 2 of the accompanying drawings) to which reference is subsequently made have the same reference numerals as corresponding items in the previously described generator with the addition of a prime (e.g. 1'), Correponding pulse signals supplied by the two generators are combined by means of diode gates and the resulting signals (which are unaffected by failure of either generator) are filtered to derive oscillations having frequencies equal respectively to the recurrence frequencies of the pulse signals from which they are derived. The gating and filtering arrangements 37 to 40 are shown diagrammatically as boxes in FIG. 1 but a typical circuit of the arrangement 40 for deriving oscillations having a frequency of 60 kilohertz from the pulse signals on leads 24 and 24' is shown in FIG. 3 of the drawings.

Thus, referring now to FIG. 3, the pulse signals on leads 24 and 24' are combined by means of diodes 41 and 42 (which constitute an 'OR' gate) and the resulting signal is applied to the primary winding 43 of a transformer 44. A capacitor 45 is connected across the secondary winding 46 of the transformer 44 and the required 60 kilohertz oscillations are supplied over an output lead 47.

With the arrangement described in the last two paragraphs, it is of course essential for corresponding signals supplied by the two generators to have exactly the same frequency and to be in phase. The manner in which this is achieved will now be described.

Referring again to FIG. 2, the clock pulse source 1' is brought into phase synchronism with the clock pulse source 1 by comparing the signal supplied thereby with the signal supplied by the source 1 (the switch S2 being closed) by means of an auxiliary phase detector 36'. The signal supplied by the detector 36' is filtered by means of a filter 48' and the resulting signal is combined in a summing amplifier 49' to off-set the steady controlling signal supplied to the oscillator 31' so as to correct the phase of that oscillator relative to the oscillator 31. The lock range of the phase-locked loop including the detector 36' is 180° with the middle of the range corresponding to the signals supplied to the detector 36' being in phase so as to enable the oscillator 31' to be synchronised in phase with oscillator 31 with a lock range of ±90°.

At the end of each cycle of operation of the counter 4, that is to say at a frequency of 4 kilohertz, that counter supplies a synchronising pulse over a lead 51. Each such synchronising pulse has a duration of one clock pulse (as supplied by the source 1) and is passed via the supervisory equipment 28 to the counters 3' and 4' where it is utilised to set those counters at predetermined states if not already in those states. In this way it is ensured that counters 3' and 4' operate in phase with the counters 3 and 4 respectively.

In the system as described above, it will be appreciated that the generator shown in the lower half of the drawing acts as a master generator and the other generator as a slave to it. This role may be reversed under the control of the supervisory equipment 28 which responds in known manner to operating conditions in the two generators. When the role is reversed, the position of the switches S1 and S2 (which are shown as being coupled together) are changed so that the oscillator 31 of the clock pulse source 7 is locked to the oscillator 31' of the source 1'. At the same time the equipment 28 interrupts the supply of synchronising pulses over the lead 51 but completes a circuit for the supply of synchronising pulses from the counter 4' over the lead 51' to the counters 3 and 4. Conveniently the equipment 28 provides gates (not shown) in the leads 51 and 51', these gates being controlled in dependence upon which generator, as determined by the equipment 28, is acting as master at any time.

We claim:

1. Apparatus for generating a plurality of electric signals, said apparatus comprising:
(A) a read-only-memory having storage locations for a plurality of digital words,
(B) means cyclically to address said storage locations to cause each digital word to be read out in turn, and
(C) a plurality of means each responding to a corresponding different digit of the digital words read from the memory to derive respective electric pulse signals each of which have different fundamental frequencies.

2. Apparatus according to claim 1 wherein each of said plurality of means comprises a latch which periodically takes up a state depending upon the controlling digit value at that time.

3. Apparatus according to claim 1 wherein said read-only memory also supplies a parity checking signal as a result of being addressed as aforesaid, the parity checking signal being utilised to detect incorrect operation of the apparatus.

4. Apparatus according to claim 1 wherein there are also provided filters respectively to select oscillations having different frequencies from the pulse signals supplied by said plurality of means.

5. A signal generating system comprising two sets of apparatus each as specified in claim 1, means to ensure that the two sets run in synchronism and gating means to combine the corresponding signals supplied by the two sets, the arrangement providing for continued operation of the system in the event of equipment failure by either set of apparatus.

6. A system according to claim 5 wherein the gating means comprises a plurality of 'OR' gates, each of these 'OR' gates being arranged in the absence of equipment failure to combine corresponding signals supplied respectively by the two sets of apparatus.

7. A system according to claim 5 also including a plurality of filters arranged respectively to select oscillations having different frequencies from the pulse signals supplied by the gating means.

8. A system according to claim 5, wherein the means to ensure that the two sets run in synchronism operate in a master and slave relationship and is arranged so that selectively either one of the two sets may be the master set.

9. A method of generating a plurality of electric signals of the kind in which the signals have different periodically recurring waveforms, said method comprising the steps of:
 (A) storing a respective multi-digit number in each of a plurality of locations of a read-only-memory,
 (B) cyclically addressing the read-only-memory to cause each of the multi-digit numbers to be read out in turn, and
 (C) individually processing each digit of the multi-digit numbers so read out to obtain a respective electric signal for each of the digits,
 (D) each of the electric signals having a respective different periodically recurring waveform related to the numerical values of the respective series of digits from which it is derived.

10. A method according to claim 9 comprising the additional step of filtering the electric signals supplied derived from the multi-digit numbers to obtain a plurality of oscillations having a sine wave form.

11. A method according to claim 9 wherein each multi-digit number stored in the read-only-memory is a binary number.

* * * * *